C. W. MARTIN.
FISHING TACKLE.
APPLICATION FILED NOV. 6, 1917.
1,257,907.
Patented Feb. 26, 1918.
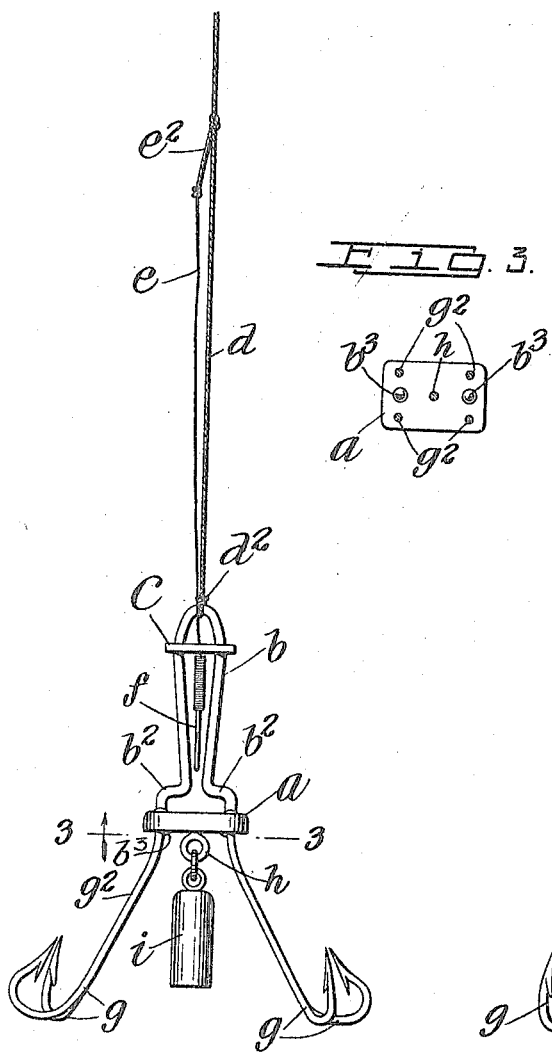
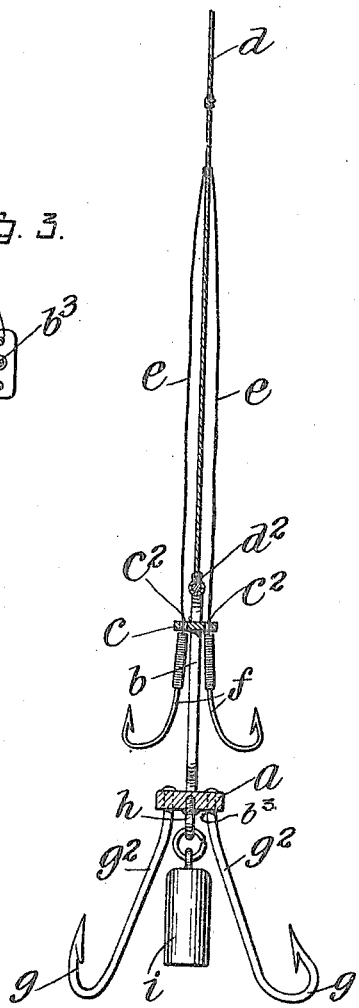
Inventor
Charles W. Martin,
By his Attorneys

UNITED STATES PATENT OFFICE.

CHARLES W. MARTIN, OF BROOKLYN, NEW YORK.

FISHING-TACKLE.

1,257,907.  Specification of Letters Patent.  Patented Feb. 26, 1918.

Application filed November 6, 1917. Serial No. 200,608.

*To all whom it may concern:*

Be it known that I, CHARLES W. MARTIN, a citizen of the United States, and residing at Brooklyn, in the county of Kings and State of New York, have invented certain new and useful Improvements in Fishing-Tackle, of which the following is a specification, such as will enable those skilled in the art to which it appertains to make and use the same.

This invention relates to fishing tackle, and the object thereof is to provide an improved device of this class designed particularly for use in deep water or sea water fishing, but which may be used in any kind or class of fishing.

The invention is fully disclosed in the following specification, of which the accompanying drawing forms a part, in which the separate parts of my improvement are designated by suitable reference characters in each of the views, and in which:

Figure 1 is a side view of my improved fishing tackle;

Fig. 2 a view at right angles to that of Fig. 1, with part of the construction in section; and, Fig. 3 a section on the line 3—3 of Fig. 1.

In the practice of my invention, I provide a head block $a$ with which is connected a yoke-shaped hanger $b$, having side end portions $b^2$ which are passed downwardly through the head block $a$ as shown at $b^3$, and are secured therein, or thereto, in any desired manner.

Mounted on the top portion of the yoke-shaped hanger $b$ is a cross head $c$ having apertures $c^2$. In the use of my improved fishing tackle a line $d$ is connected with the top of the yoke-shaped hanger $b$ as shown at $d^2$ and snells $e$ are connected with the line $d$ at $e^2$, in any desired manner, and said snells are passed downwardly and loosely through the cross head $c$ and provided with hooks $f$ which are connected therewith in the usual or any desired manner.

Secured to the head block $a$ are a plurality of hooks $g$, four of which are preferably employed, and the shanks $g^2$ of these hooks, in the construction shown, are passed through the corner parts of the head block $a$ and are bent so as to support said hooks in the position shown in Figs. 1 and 2, and secured to the center of the bottom of the head block $a$ is an eye-screw or similar device $h$ from which may be suspended a weight $i$. The weight of the device will be sufficient to sink it under ordinary conditions, but the weight $i$ may be employed when necessary.

In practice, the bait is applied to the hooks $f$ in the usual manner and any nibble at the bait, or attempt to steal the bait will be transmitted through the snells $e$ to the line $d$ and a quick jerk or pull on said line will result in catching a fish either on one of the hooks $f$, or on one of the hooks $g$.

In the construction shown, the hooks $f$ are supported by the snells $e$ closely adjacent to the cross head $c$, but said hooks may be supported in a lower position, if desired.

While I have shown the form of my improved fishing tackle which I prefer, my invention is not limited to the details thereof, as herein shown and described, and various changes therein and modifications thereof may be made, within the scope of the appended claims, without departing from the spirit of my invention, or sacrificing its advantages.

Having fully described my invention, what I claim as new and desire to secure by Letters Patent, is:—

1. In a device of the class described, a head block having a plurality of fish hooks suspended therefrom, a hanger connected with the top of said block, and a cross head member connected with the top portion of said hanger and provided with apertures.

2. A device of the class described, comprising a head block having a plurality of fish hooks suspended therefrom, a hanger connected with the top of said block and with which a line is adapted to be connected, a cross head member connected with the top portion of said hanger and provided with apertures, and snells adapted to be connected with said line and to be passed downwardly and loosely through said cross head member and provided with hooks.

In testimony that I claim the foregoing as my invention I have signed my name in presence of the subscribing witnesses this 3rd day of November, 1917.

CHARLES W. MARTIN.

Witnesses:
C. E. MULREANY,
H. E. THOMPSON.